(12) United States Patent
Cifers (10) Patent No.: US 12,331,874 B1
(45) Date of Patent: *Jun. 17, 2025

(54) TEE-BOLT FOR USE WITH ACCESSORY MOUNTING TRACK

(71) Applicant: YakAttack LLC, Farmville, VA (US)

(72) Inventor: Luther Cifers, Farmville, VA (US)

(73) Assignee: YakAttack LLC, Farmville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,727

(22) Filed: Jan. 8, 2024

Related U.S. Application Data (63) Continuation of application No. 17/511,892, filed on Oct. 27, 2021, now Pat. No. 11,867,353, which is a continuation-in-part of application No. 15/831,400, filed on Dec. 5, 2017, now abandoned, which is a continuation of application No. 13/960,772, filed on Aug. 6, 2013, now Pat. No. 9,863,576, which is a continuation-in-part of application No. 13/954,253, filed on Jul. 30, 2013, now Pat. No. 9,671,060.

(Continued)

(51) Int. Cl.
| | |
|---|---|
| *F16M 13/02* | (2006.01) |
| *F16B 7/04* | (2006.01) |
| *F16B 35/06* | (2006.01) |
| *F16M 11/14* | (2006.01) |
| *F16M 11/20* | (2006.01) |

(52) U.S. Cl.
CPC .............. *F16M 13/02* (2013.01); *F16B 7/04* (2013.01); *F16B 35/06* (2013.01); *F16M 11/14* (2013.01); *F16M 11/2085* (2013.01); *F16B 2200/30* (2018.08)

(58) Field of Classification Search
CPC .. B21D 41/021; B21J 15/046; Y10T 29/4992; Y10T 29/49948; Y10T 29/49936; Y10T 29/49915; F16M 13/02; F16M 11/2085; F16B 35/06; F16B 7/04; F16B 2200/30; F16B 39/023
USPC ........................................................ 411/325
See application file for complete search history.

(56) References Cited

U.S. PATENT DOCUMENTS

| | | |
|---|---|---|
| 107,704 A | 9/1870 | Moorcroft |
| 736,647 A | 8/1903 | Staiger |

(Continued)

OTHER PUBLICATIONS

USPTO, Office Action dated Nov. 23, 2022 in related U.S. Appl. No. 17/511,892, filed Oct. 27, 2021.

(Continued)

*Primary Examiner* — Kimberly T Wood
(74) *Attorney, Agent, or Firm* — Thedford I. Hitaffer; Hitaffer & Hitaffer, PLLC (57) ABSTRACT

A tee-bolt for use with an accessory mounting track provides a quick and easy removable attachment of various devices. The tee-bolt comprises a head comprising upper and lower surfaces and a female threaded hole passing therethrough between the upper and lower surfaces, and a stud comprising a male thread having an end threaded through the head so that the end is flush with the lower surface of the head and a portion of the stud extends from the upper surface of the head. The end of the stud is flared outwardly within the threaded hole and flush with the lower surface of the head by the application of pressure to form a flare that interacts with the head to inhibit separation of the head and the stud.

8 Claims, 8 Drawing Sheets

Related U.S. Application Data

(60) Provisional application No. 61/680,254, filed on Aug. 6, 2012, provisional application No. 61/677,455, filed on Jul. 30, 2012.

(56) References Cited

U.S. PATENT DOCUMENTS

| | | | |
|---|---|---|---|
| 1,705,086 | A | 3/1929 | Ferguson |
| 1,809,758 | A | 6/1931 | Heyman |
| 2,076,160 | A | 4/1937 | Robinson |
| 2,185,939 | A | 1/1940 | Deshon et al. |
| 2,269,847 | A | 1/1942 | Feinson |
| 4,084,289 | A | 4/1978 | Naimo |
| 4,530,493 | A | 7/1985 | Break |
| 11,867,353 | B1 * | 1/2024 | Cifers .................... F16B 7/04 |
| 2003/0053882 | A1 | 3/2003 | Reuter |
| 2005/0092876 | A1 | 5/2005 | Carnevali |

OTHER PUBLICATIONS

USPTO, Final Office Action dated Mar. 31, 2023 in related U.S. Appl. No. 17/511,892, filed Oct. 27, 2021.

USPTO, Advisory Action dated Jun. 16, 2023 in related U.S. Appl. No. 17/511,892, filed Oct. 27, 2021.

USPTO, Examiner's Interview Summary dated Oct. 18, 2023 in related U.S. Appl. No. 17/511,892, filed Oct. 27, 2021.

* cited by examiner

TEE-BOLT FOR USE WITH ACCESSORY MOUNTING TRACK

CROSS-REFERENCE TO RELATED APPLICATIONS

This application is a continuation of U.S. patent application Ser. No. 17/511,892, filed Oct. 27, 2021, which is a continuation-in-part of U.S. patent application Ser. No. 15/831,400, filed Dec. 5, 2017, which is a continuation of U.S. patent application Ser. No. 13/960,772, filed Aug. 6, 2013, issued as U.S. Pat. No. 9,863,576, on Jan. 9, 2018, which is a continuation-in-part of U.S. patent application Ser. No. 13/954,253, filed Jul. 30, 2013, issued as U.S. Pat. No. 9,671,060, on Jun. 6, 2017, which claims the benefit of U.S. Provisional Application No. 61/680,254, filed Aug. 6, 2012, and claims the benefit of U.S. Provisional Application No. 61/677,455, filed Jul. 30, 2012, the disclosures of which are incorporated herein by reference in their entirety.

BACKGROUND

This invention relates in general to the connection of accessory devices to vehicles or structures, and more particularly, to an accessory mounting system that may be fixed to an environment, providing a secure attachment point for various accessory devices.

Devices such as camera mounts, fishing rod holders, personal electronics cradles, marine depth finders, visibility beacons, and various other implements frequently require quick and easy attachment and removal from structures and vehicles, such as personal watercraft, boats, all terrain vehicles, airplanes, automobiles, military vehicles and other vehicles and structures utilizing such devices.

In addition to these devices, other items associated with various environments are commonly stored and organized as many environments contain a variety of items that need to be stored or organized. Within the scope herein, the term "device" shall refer to any item that may be stored or organized in a given environment, or a bracket designed to support such an item.

In some cases, it may be desirable to alter the deployment configuration of these devices, either by arrangement or position. It may also be desirable to interchangeably attach these devices to fixed mounts and track systems, with the fixed mount providing a rigid, low cost, single point of attachment and the track system providing a range of deployment positions that may be altered during attachment or while being used in the field.

These devices have been attached using a variety of methods, including direct and non-removable attachment to the environment, or removable attachment by means of a variety of mounting systems. While a variety of mounting systems have been utilized in some applications, they are each limited in performance by their respective designs. In most cases these attachment methods are not compatible with track systems. These mounting systems may also be too large to fit in tight spaces, and may not have a low-profile design that is desirable in many applications.

There remains a need for an accessory mounting bracket, tee-bolt and attachment device that provides a secure means of removable attachment, is compatible with accessory track systems, utilizes a small footprint and low profile, and is designed for surface mounting.

SUMMARY

The present invention relates to a tee-bolt for use with an accessory mounting system that provides a quick and easy removable attachment of various devices. The tee-bolt comprises a head comprising upper and lower surfaces and a female threaded hole passing therethrough between the upper and lower surfaces, and a stud comprising a male thread having an end threaded through the head so that the end is flush with the lower surface of the head and a portion of the stud extends from the upper surface of the head. The end of the stud is flared outwardly within the threaded hole and flush with the lower surface of the head by the application of pressure to form a flare that interacts with the head to inhibit separation of the head and the stud.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
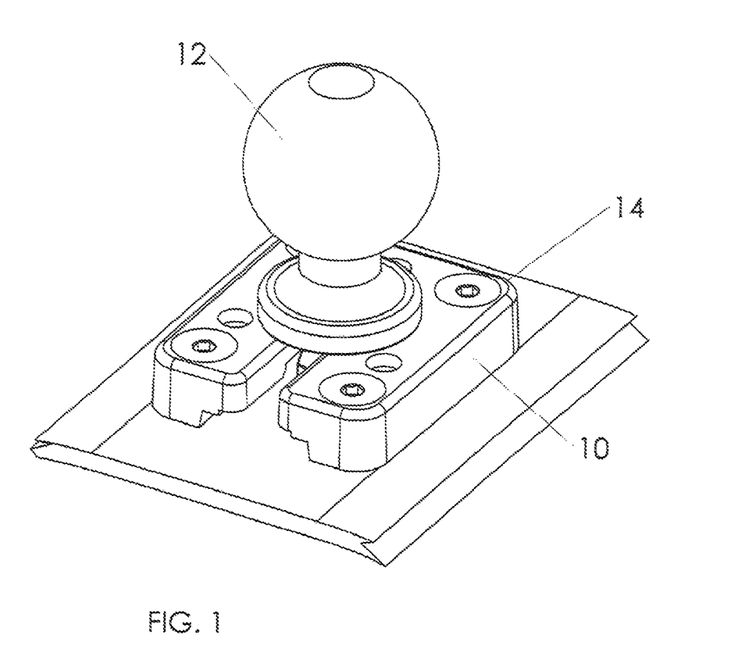
FIG. 1 is a perspective view of an accessory mounting bracket attached to a supporting environmental surface with a device attached to the accessory mounting bracket.

Referring now to the drawings, wherein like numerals designate like components throughout all of the several figures, there is illustrated in FIG. 1 an accessory mounting bracket 10 for removably attaching a device 12 to a supporting environmental surface 14.

Exemplary devices are shown in U.S. patent application Ser. No. 13/897,916, filed May 20, 2013, entitled Monopod Turret Support, and U.S. patent application Ser. No. 13/476,441, filed May 21, 2012, published as US Patent Application Publication No. 2012/0293990, entitled Fold-Up Beacon and Associated Post for Vehicles, the disclosures of which are incorporated herein by reference.

It shall be observed that the device 12 shown is an example (e.g., a ball for a ball and socket mounting system) of a device that may be attached to the accessory mounting bracket 10, but a number of devices of many sizes, shapes, and uses, or brackets designed to clamp or support such devices, could be used instead of or in addition to the device 12. The depiction of the device 12 shall not in any way be construed as a limitation as to the size, shape, or type of device that could be attached to the accessory mounting bracket 10.

The supporting environmental surface 14 may be part of a vehicle, such as a boat or kayak, for example. The supporting environmental surface 14 may alternately be part of a structure, such as a wall in a building or an armrest of a tree stand, for example. It shall be observed that the supporting environmental surface 14 is a graphical representation of an example of such a surface, but that it does not limit in any way the size, shape, or configuration of possible supporting environmental surfaces or the method of attachment to such surfaces.

Figure 2:
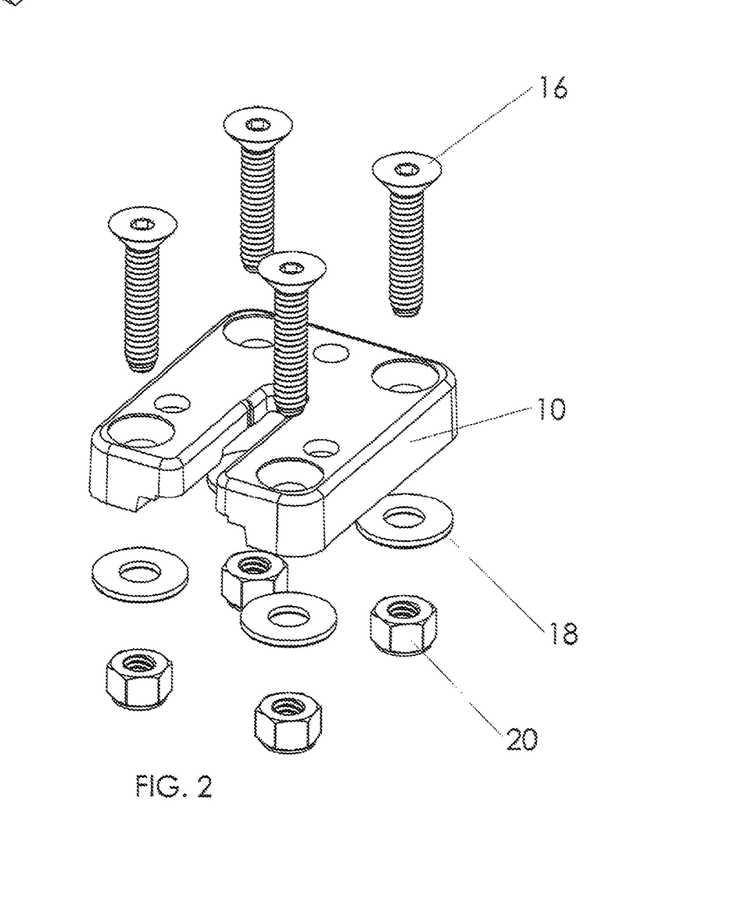
FIG. 2 is an exploded perspective view of an accessory mounting bracket with an example of attachment hardware.

Referring now to FIG. 2, the accessory mounting bracket 10 may be attached to the environment with one or more mounting screws 16, washers 18, and nuts 20. As previously mentioned, it shall be understood that alternate methods of attachment to the supporting environmental surface 14 may be utilized without limiting the scope of this disclosure.

Looking now at FIGS. 3 through 8, the accessory mounting bracket 10 may comprise a base structure 22 with attachment holes 24. The attachment holes 24 may have a countersink feature 26 or a counter bore feature (not shown).

The accessory mounting bracket 10 may comprise one or more auxiliary device attachment holes 28, a track attachment hole 30, and an open-ended slot 34. The auxiliary device attachment holes 28 may have a nut retention pocket 29 (shown in FIG. 6) on the opposite side of the accessory mounting bracket 10. The open-ended slot 34 may comprise a slot opening 36 on one end and a slot termination 38 on another end.

The accessory mounting bracket 10 may further comprise a device mounting interface 32, a clearance channel 40 which may terminate at a retention pocket 42, a left lateral support pad 44, and a right lateral support pad 46. The retention pocket 42 may have a chamfer 48 that exists around the perimeter, at the interface between the clearance channel 40 and the retention pocket 42.

It may be mentioned at this point that, for the scope of this entire disclosure, orientation terms, such as "top" and "bottom" or "left" and "right", refer to their subject matter as semantic conveniences only and not as a necessary condition of the accessory mounting bracket 10, as the accessory mounting bracket 10 may obviously be utilized in any desired position or orientation.

Referring now to FIGS. 9 through 12, a device 12 is shown being attached to the accessory mounting bracket 10. There is a tee-bolt 50 comprising a head 52 and a stud 54 threaded into the device 12. The tee-bolt 50 is in the open-ended slot 34 (shown in FIG. 3), oriented so that the stud 54 passes through the open-ended slot 34 and into the threads in the device 12. In the state shown in FIG. 10, the device 12 is in a position in which it is installed but not tightened. The preferred method of this installation is to insert the stud 54 of the tee-bolt 50 into the slot opening 36 (shown in FIG. 3) until the stud 54 makes contact with the slot termination 38 (also shown in FIG. 3). It should be appreciated that the clearance channel 40 is of sufficient depth to allow the head 52 of the tee-bolt 50 to pass between the supporting environmental surface 14 and the accessory mounting bracket 10.

Figure 3:
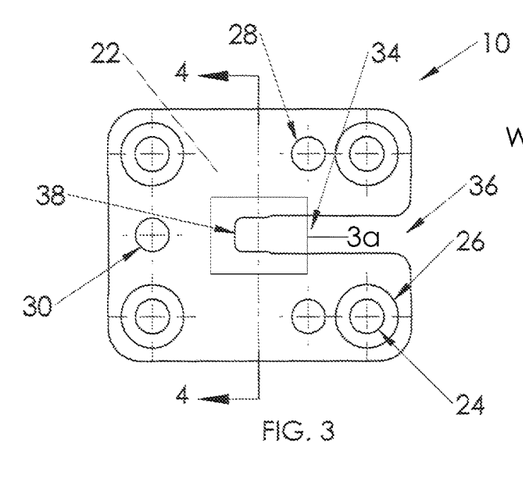
FIG. 3 is a plan view of an accessory mounting bracket.
Figures 3A, 4:
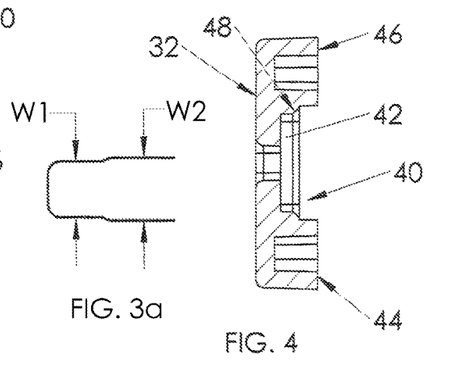
FIG. 3*a* is a detailed view of an opening ended slot of the accessory mounting bracket taken from 3*a* in FIG. 3.
FIG. 4 is a cross sectional view of an accessory mounting bracket taken along the line 4-4 in FIG. 3.
Figure 5:
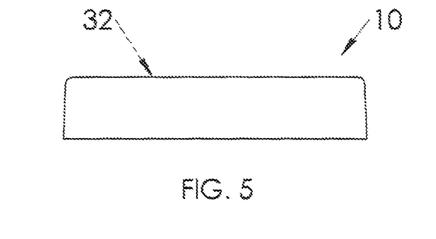
FIG. 5 is a side elevational view of the accessory mounting bracket shown in FIG. 3.
Figure 6:
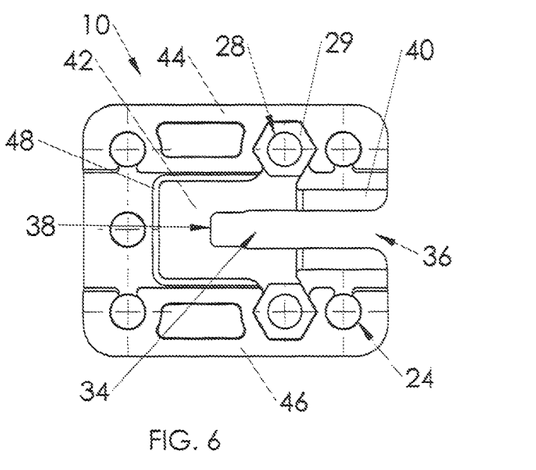
FIG. 6 is a projected bottom view of the accessory mounting bracket shown in FIG. 5.
Figure 7:
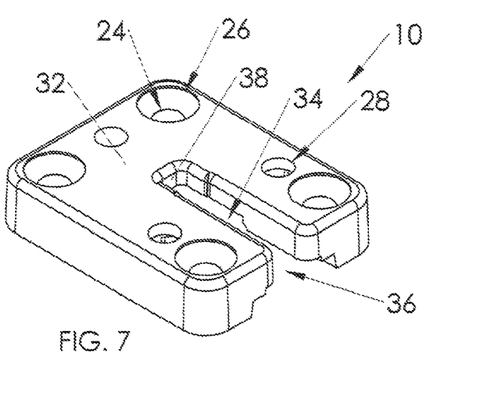
FIG. 7 is a projected perspective view of the top side of the accessory mounting bracket shown in FIG. 5.
Figure 8:
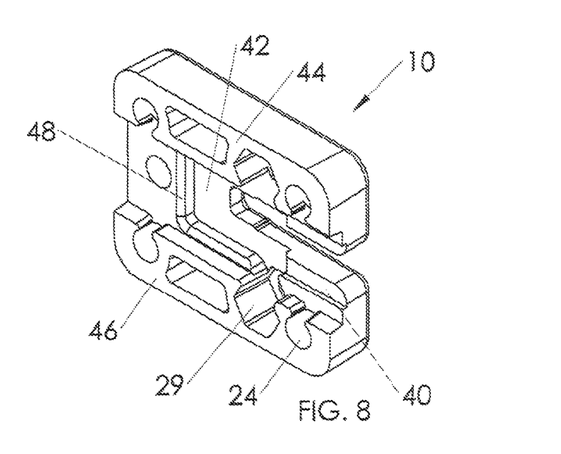
FIG. 8 is a projected perspective view of the bottom side of the accessory mounting bracket shown in FIG. 5.

The open-ended slot 34 may have varying widths. For example, as shown in FIG. 3a, the open-ended slot 34 may have a narrow section with a width W1 and a wide section with a width W2, wherein width W1 is smaller than width W2. The narrow section of the open-ended slot 34 may be sized in such a way to restrict the removal of the tee-bolt in an upwards direction through the open-ended slot 34.

Once the device 12 is fully inserted into the slot 34, the device may be lifted in a direction perpendicular to and away from the device mounting interface 32, causing the head 52 of the tee-bolt 50 to enter the retention pocket 42, which may be of sufficient width and length to accommodate the head 52 of the tee-bolt 50 closely so that the head 52 of the tee-bolt 50 is unable to turn a full rotation. We can see in FIG. 12 that the retention pocket 42 may serve as a mechanical restraint, restricting rotation of the head 52 of the tee-bolt 50.

Figures 11, 12:
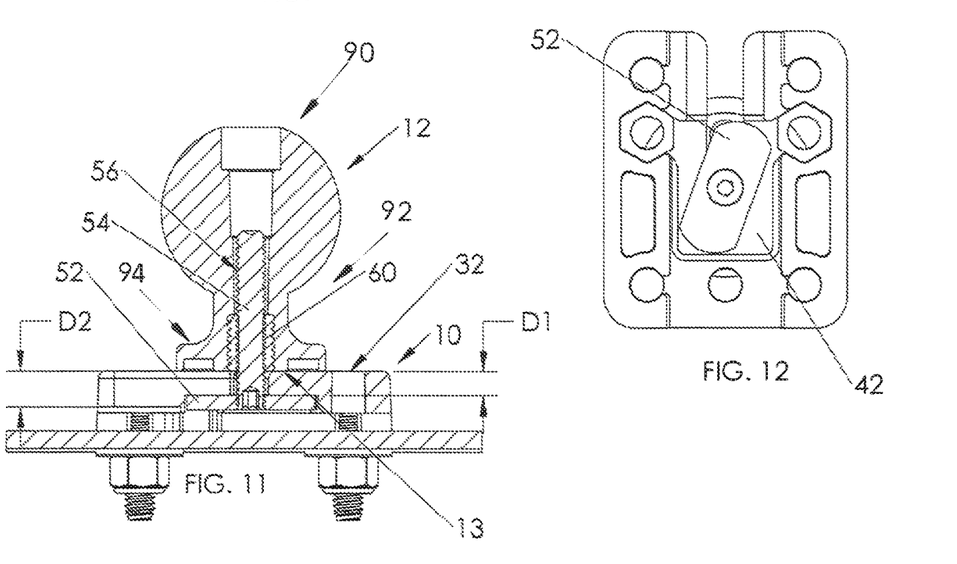
FIG. 11 is a cross sectional view taken along the line 11-11 in FIG. 9, in an unexploded state.
FIG. 12 is a bottom plan view of the accessory mounting bracket shown in FIG. 9.

As shown in FIG. 11, the device 12 may comprise a ball 90 and a base 92. A threaded member 80 may be supported within the base 92 of the device 12, the threaded member 80 having female threads 60, which are threaded onto the stud 54 of the tee-bolt 50. The threaded member 80 is separate from the device 12, and has an interface surface 84 that cooperates with the device 12.

It should be appreciated that by rotating the device 12, the threads 56 of the stud 54 may interact with the female threads 60, which may urge the device 12 towards or away from the head 52 of the tee-bolt 50, depending on the direction of rotation. When sufficiently rotated, the device 12 may be urged towards the head 52 of the tee-bolt 50 until the mounting surface 13 of the device 12 makes contact with the device mounting interface 32 of the accessory mounting bracket 10 and the head upper surface 58 (shown in FIG. 10) makes contact with the inside of the retention pocket 42 (shown in FIG. 12). When the device 12 is turned further, friction may increase between these surfaces 13, 32 and 42, 58, which may effectively lock the device 12 in position.

The threaded member 80 may be made of a hard and rigid material, such as metal material.

By rotating the device 12 in the opposite direction, the friction may be eliminated. However, because the distance D1 (shown in FIG. 11) between the inside of the retention pocket 42 and the device mounting interface 32 is substantially less than the distance D2 (also shown in FIG. 11) between the clearance channel 40 and the device mounting interface 32, removal of the device 12 may not be achieved until the device 12 is continually rotated until the distance between the head upper surface 58 of the head 52 and the mounting surface 13 of the device 12 is greater than the distance D3 (shown in FIG. 10) between the clearance channel 40 and the device mounting interface 32. This additional rotation of the device 12, required for removal of the device 12 from the accessory mounting bracket 10, may provide significant security against accidental removal of the device 12 from the accessory mounting bracket 10 if the device 12 is inadvertently rotated in the direction that urges the tee-bolt 50 away from the device 12.

Figure 9:
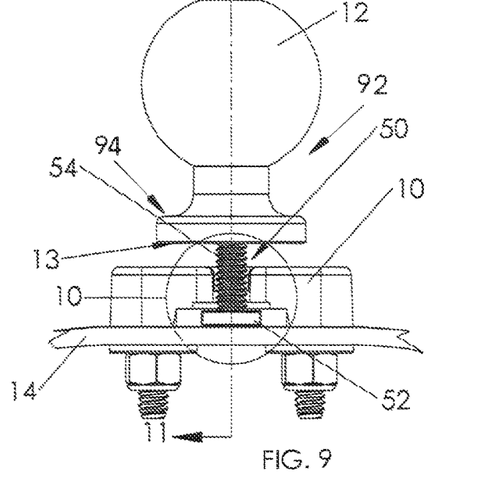
FIG. 9 is a partially exploded front elevational view of the accessory mounting bracket shown in FIG. 1.
Figure 10:
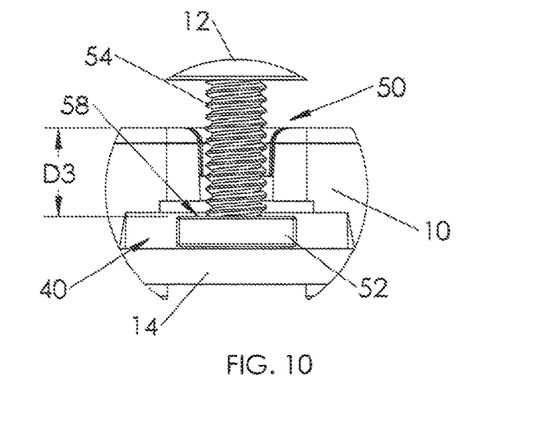
FIG. 10 is an exploded elevational detail view of components partially revealed in FIG. 9.
Figure 13:
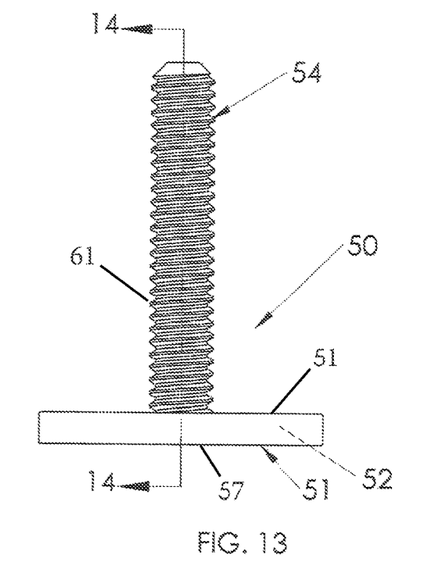
FIG. 13 is an elevational view of a tee-bolt assembly.
Figure 14:
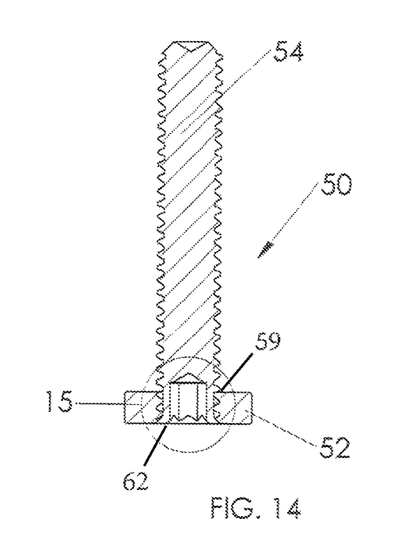
FIG. 14 is a cross sectional view of a tee-bolt assembly taken along the line 14-14 in FIG. 13.
Figure 15:
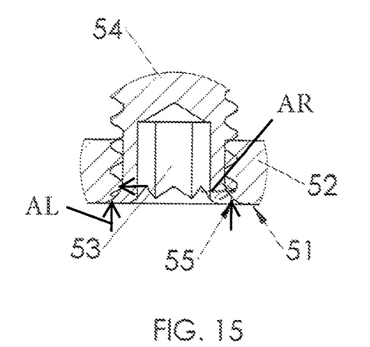
FIG. 15 is an exploded elevational detail view of components partially revealed in FIG. 14.
Figure 21:
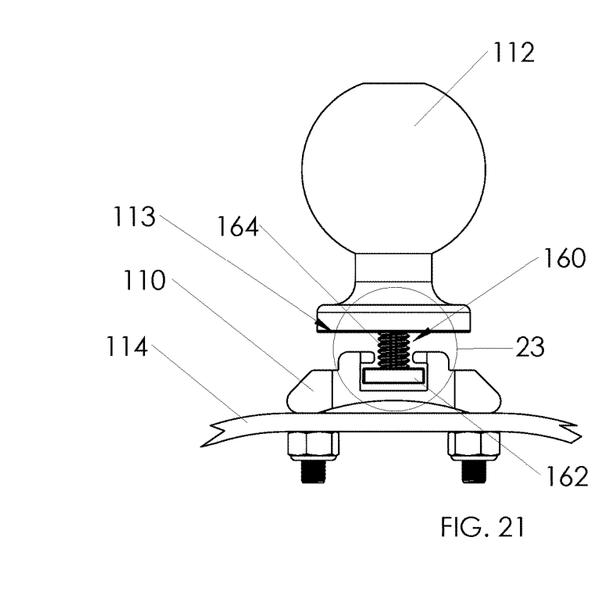
FIG. 21 is a partially exploded end view of the components shown in FIG. 17.
Figure 22:
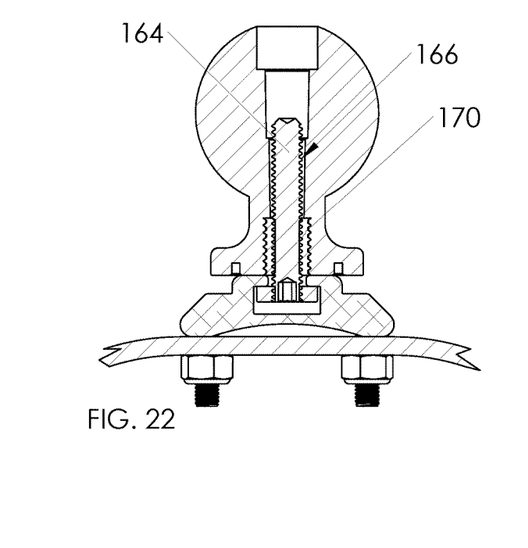
FIG. 22 is similar to FIG. 21 except it is not exploded and is shown at a section cut through the center of the device.
Figure 23:
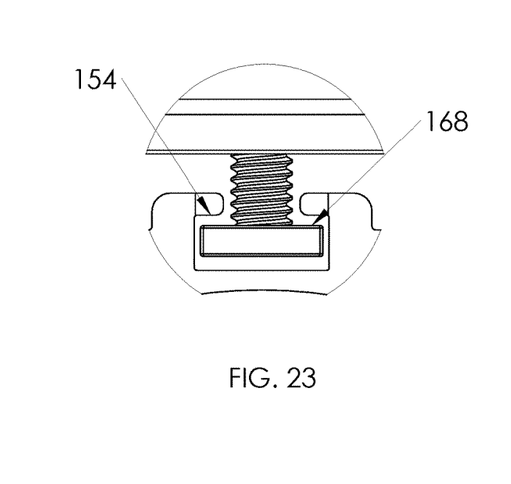
FIG. 23 is an enlarged view of the detail referenced as 23 in FIG. 21.

Looking now to FIGS. 13 through 15, we can see a tee-bolt 50 in its assembled state. The tee-bolt 50 may be an assembly, comprised of a solid flat metal head 52 and a solid elongated metal threaded stud 54. The head 52 comprises an upper planar surface 51 and a lower planar surface 57, and a threaded hole 59 with a female thread passing through the head 52 between the upper and lower surface 51, 57. The stud 54 comprises a male thread 61 in an outer surface of the stud 54 and having an end 62 threaded into and through the head 52 but not beyond the lower planar surface 57 of the head 52 so that the end 62 is flush with the lower surface 57 of the head 52 and a portion of the stud 54 extends from the upper planar surface 51 of the head 52. The threaded stud 54 may have a blind hole 53 whose shape may be circular or polygon, or another shape. The blind hole 53 serves as a central point from which a flare 55 may be formed. The flare 55 of the stud 54 interacts with the head 52 of the tee-bolt 50 in a way that substantially inhibits separation of the head 52 and the stud 54. The flare 55 may be formed by inserting a mandrel (not shown), which may be conical or some other shape, into a recessed pocket in the center of the threaded stud 54, with the head 52 adequately supported to maintain its flatness, and applying pressure, which may form the flare 55 (i.e., the stud 54 is flared outwardly within the threaded hole 55 and flush with the lower surface 57 of the head 52 by the application of pressure, thus forming the flare 55, which interacts with the head 52 to inhibit separation of the head 52 and the stud 54). The application of pressure creates an outward or radial pressure completely about the stud 54 between the stud 54 and the head 52 (i.e., in a direction the arrows AR when viewing FIG. 15 between the male threads of the stud 54 and the female threads of the threaded hole passing through the head 52 completely about the stud 54), while at the same time, creates a longitudinal pressure in a lengthwise direction of the stud 54 and completely about the stud 54 between the stud 54 and the head 52 (i.e., in a direction the arrows AL when viewing FIG. 15 between the male threads of the stud 54 and the female threads of the threaded hole passing through the head 52 and completely about the stud 54). This creates a mechanical interference that inhibits separation of the head 52 and the stud 54. At the same time, the head 52 is adequately supported to maintain the flatness of the head 52 so that the head 52 may fit within the channel of an accessory mounting bracket, such as the mounting bracket 10 (e.g., as shown in FIGS. 9-11) or an accessory mounting track, such as the track 110 (e.g., as shown in FIGS. 21-23). The stud 54 is sized to extend through a slot in communication with the channel and the end # of the stud 54 is flush with the lower surface 57 of the head 52 so as to permit unencumbered travel of the head 52 in the channel. Secondary operations may be utilized to create dimples or other features (not shown), which may enhance the mechanical interference between the head 52 and the threaded stud 54.

Figure 25:
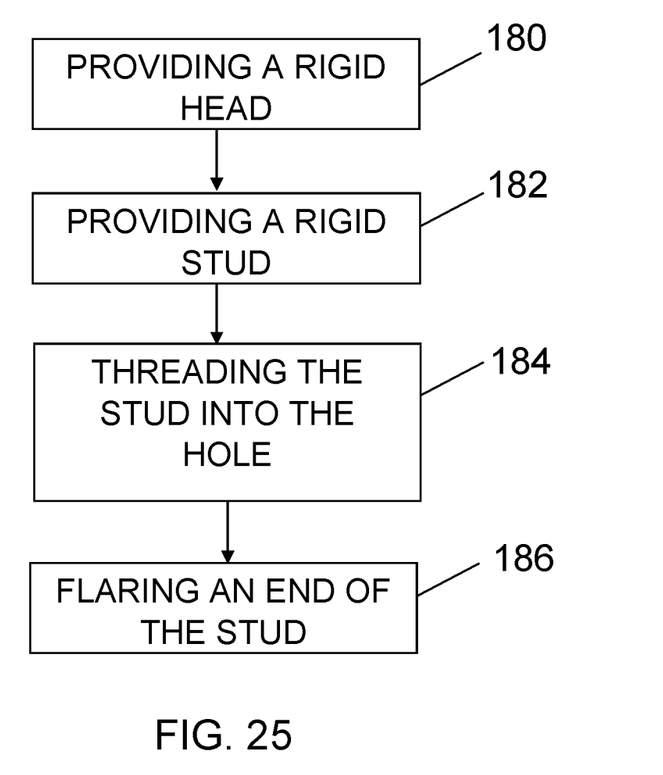
FIG. 25 is a diagrammatic representation of a method for making a tee-bolt.
Figure 26:
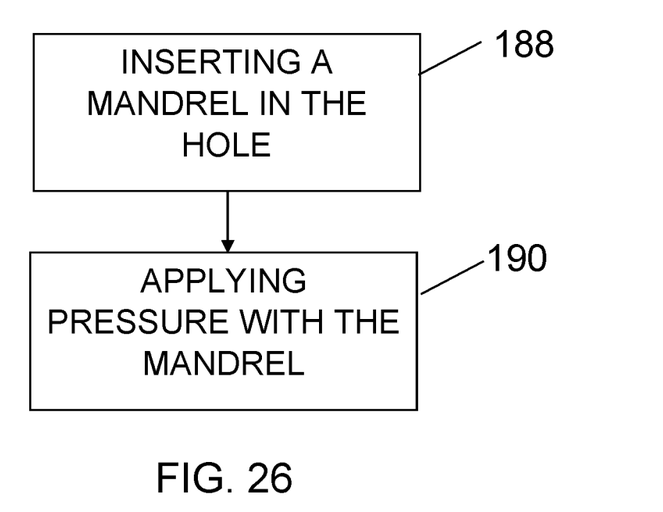
FIG. 26 is a diagrammatic representation of a method for flaring the end of a stud of the tee-bolt.

A method for making the tee-bolt 50 may comprise the steps of providing a rigid head comprising a female threaded hole passing through the head between upper and lower surfaces of the head, as shown in method step 180, shown in FIG. 25. A rigid stud is provided having a male thread along an outer surface of the stud and a hole in an end of the stud, as shown in method step 182. The stud is threaded into the threaded hole until the end of the stud is substantially flush with the lower planar surface of the head and a portion of the stud extends from the upper planar surface of the head, as shown in method step 184. The end of the stud is flared outward within the threaded hole to form a flare in the end of the stud that causes the end of the stud to interact with the head to inhibit separation of the head and the stud, as shown in method step 186. The stud is flared by inserting a mandrel in the hole in the end of the stud, as shown in method step 188, and applying pressure with the mandrel to the end of the stud and within the hole in the end of the stud to form the flare in the end of the stud, as shown in method step 190. The hole in the end of the stud is centered in the end of the stud and functions as a central point from which the flare is formed. The hole in the end of the stud is circular or octagonal and the mandrel is conical in shape.

Figure 16:
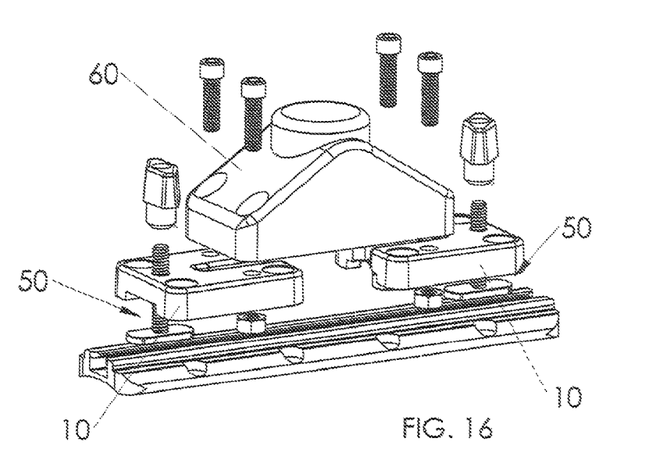
FIG. 16 is an exploded view of an arrangement demonstrating how a pair of accessory mounting brackets can be configured to attach a device to an accessory mounting track.

It should be understood that although a tee-bolt attachment method is depicted in these drawings, other methods of secure and removable attachment of devices to the accessory mounting bracket 10 may also be used. As mentioned, one or more auxiliary device attachment holes 28 may be used to attach a device 12. Looking at FIG. 16, we see how an alternate device 70 may be attached to an accessory mounting track 72 by utilizing two accessory mounting brackets 10 and two tee-bolts 50, which may be inserted into the accessory mounting track 72. The alternate device 70 may be different than what is depicted in these drawings. It should be understood that this is an example of an alternate use of the accessory mounting bracket 10 but other configurations with more or less accessory mounting brackets 10 may be used.

It should be clearly understood that the accessory mounting bracket 10 may comprise any suitable base structure 22 with any suitable number and design of attachment holes 24, a device mounting interface 32, a slot 36, an optional retention pocket 42, and lateral support pads 44, 46. The accessory mounting bracket 10 may also comprise one or more auxiliary attachment holes 28 for alternate attachment methods of various devices.

The accessory mounting bracket 10 composition may be of a substantially strong and lightweight material, such as plastic or aluminum. The material or surface of the accessory mounting bracket 10 may be treated for resistance to harsh environments, such as UV radiation and saltwater exposure.

Attachment of the accessory mounting bracket 10 to the environment may be achieved by putting screws 16 through one or more of the attachment holes 24 and into a receiving feature on the surface on which it is to be mounted. In some configurations, the accessory mounting bracket 10 may be attached to another adapting bracket, such as a rail clamp or accessory mounting track 72, for attachment to the environment.

As mentioned above, the tee-bolt 50 may have a head 52 on one end and threaded stud 54 on another end, and may be attached to the device 12 by screwing the threaded stud 54 of the tee-bolt 50 into the insert 80 in the device 12, leaving the head 52 of the tee-bolt 50 extended some distance from the device 12.

Attachment of the device 12 may be achieved by inserting the head 52 of the tee-bolt 50 into the slot 36, and rotating the device 12. The interaction between the threads 56 in the device 12 and the threaded stud 54 of the tee-bolt 50 may urge the head 52 of the tee-bolt 50 towards the device 12, thus causing the head 52 of the tee-bolt 50 to make contact with the underside of the retention pocket 42 and causing the device 12 to make contact with the device mounting interface 32 on the surface of the accessory mounting bracket 10 opposite the retention pocket 42. Further rotation of the device 12 may continually urge the head 52 of the tee-bolt 50 towards the device 12, creating pressure on these areas of contact 13, 32 and 42, 58, the resulting friction of which may be adequate to prevent rotation of the device 12, with reasonable force, in either the tightening or the loosening direction. For removal, the device 12 may be rotated in the opposite direction, which may force the head 52 of the tee-bolt 50 away from the device 12. Initially this may require relatively high force to overcome the friction of the tightened system, but as the device 12 is rotated the friction may dissipate, and ultimately the distance between the tee-bolt 50 and the device 12 may become great enough to remove the device 12 from the accessory mounting bracket 10.

In an alternate configuration, a slot nut and stud configuration (not shown) may be used instead of a tee-bolt. In this configuration, the nut is not permanently attached to the stud as it is in the tee-bolt configuration, but instead has threads which interact with the stud, resulting in the same tightening effect that is achieved with the tee-bolt configuration.

In applications in which excessive rotational forces may be applied to the device 12, an external locking mechanism (not shown) may be used to prevent the device 12 from rotating in the loosening direction.

Another advantage of the accessory mounting bracket 10 is that the retention pocket 42 may captivate the head 52 of the tee-bolt 50 in a way that requires a significant gap between the head 52 of the tee-bolt 50 and the device 12 before the device 12 can be removed. In order to install the device 12 on the accessory mounting bracket 10, the head 52 of the tee-bolt 50 should be some distance from the device 12. That is, the gap between the head 52 of the tee-bolt 50 and the device 12 must be greater than the thickness of the entrance of the slotted region of the accessory mounting bracket 10. Because the retention pocket 42 is recessed some distance from the underside of the accessory mounting bracket 10, the thickness of the accessory mounting bracket 10 is less in that region than in the entrance of the slotted region. As a result, the tee-bolt 50 must be further tightened once the device 12 is fully inserted into the slot 36 in order to eliminate play between the tee-bolt 50, device 12, and the accessory mounting bracket 10. Likewise, when the device 12 is loosened by rotating, it preferably cannot be removed from the accessory mounting bracket 10 until it is further rotated, enough to create a gap which is substantial enough to allow clearance from the thicker slotted region. In this way, the retention pocket 42 may function as a security feature because if the device 12 is accidentally loosened a small amount, the device 12 may not accidentally slip off of the accessory mounting bracket 10.

In an alternate application, the device 12 may be attached to the accessory mounting bracket 10 by fastening it to one or more auxiliary attachment holes 28 that may be present in the accessory mounting bracket 10. In some applications of this configuration, the accessory mounting bracket 10 may serve as an adapting bracket to attach the device 12 to an accessory mounting track 72. The shape of the bottom side of the accessory mounting bracket 10 may cooperate with the shape of the accessory mounting track 72 so that the accessory mounting bracket 10 may maintain its orientation with reference to the orientation of the accessory mounting track 72, but slide along the accessory mounting track 72 when loosened to do so.

Figure 17:
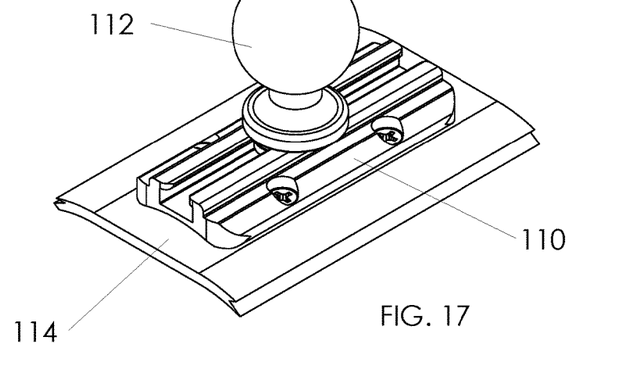
FIG. 17 is a perspective view an alternative embodiment of an accessory mounting track attached to a supporting environmental surface with a device attached to the accessory mounting track.

Referring now to FIG. 17, there is illustrated an accessory mounting track 110 comprised of a left support flange 120, a right support flange 122, and a central axis 124, which is substantially parallel to a slot channel 150. The accessory mounting track 110 may also comprise a proximal end 130 and a distal end 134 with a proximal slot entry point 132 and a distal slot entry point 136.

It may be mentioned at this point that, for the scope of this entire disclosure, orientation terms, such as "proximal" and "distal" or "left" and "right", refer to their subject matter as semantic conveniences only and not as a necessary condition of the accessory mounting track 110, as the accessory mounting track 110 may obviously be utilized in any desired position or orientation.

The accessory mounting track 110 may also comprise attachment holes 140 linearly disposed parallel to the central axis 124 near the outermost edges of the left support flange 120 and the right support flange 122. The attachment holes 140 may have a countersink feature 142 or a counter bore feature (not shown).

Figure 20:
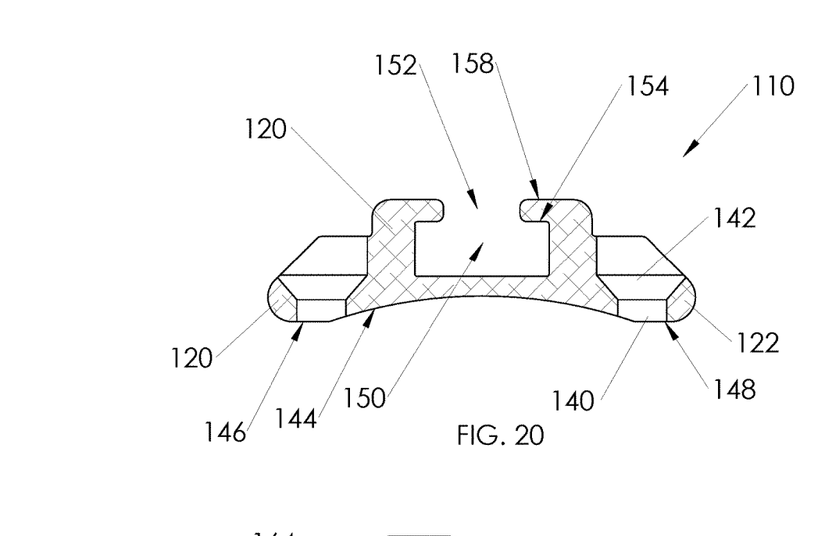
FIG. 20 is an enlarged cross-sectional view taken along the line 20-20 in FIG. 19.

Referring now to FIG. 20, the accessory mounting track 110 may have a concave recess 144, which may terminate at a left interface flat 146 and a right interface flat 148 on the bottom of the left support flange 120 and right support flange 122, respectively. The left interface flat 146 and right interface flat 48 may be approximately aligned with the attachment holes 140 in the corresponding left support flange 120 and right support flange 122. This arrangement may maximize the opportunity for the left interface flat 146 and the right interface flat 148 to have firm contact with the supporting environmental surface 114. Because of the relatively wide spacing between the left interface flat 146 and right interface flat 148, high lateral stability may be achieved. The concave recess 146 may minimize the opportunity for a curved or irregular supporting environmental surface 114 to make contact in regions between the left interface flat 46 and right interface flat 148.

The accessory mounting track 110 may also comprise a slot channel 150, which may have a slot opening 152, which may be bounded on each side by a containment ledge 154.

Figure 18:
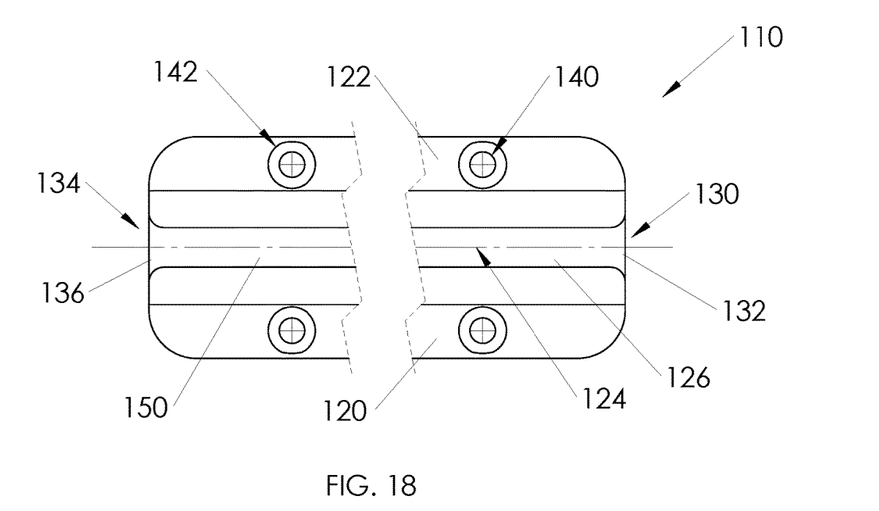
FIG. 18 is a top plan view of the alternative embodiment of an accessory mounting track.
Figure 19:
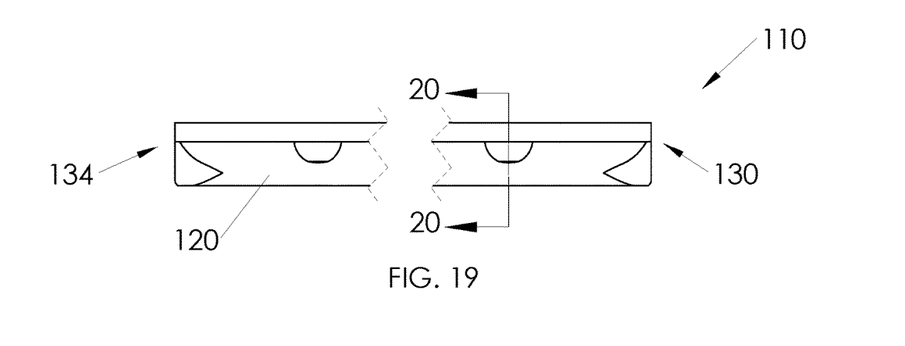
FIG. 19 is an elevational view of the accessory mounting track shown in FIG. 18.

Referring now to FIG. 21, a device 112 is shown being attached to the accessory mounting track 110. There is a tee-bolt 160 comprising a head 162 and a stud 164 threaded into the device 112. The tee-bolt 160 is in the slot channel 150, oriented so that the stud 164 is in the slot opening 152. In the state shown in FIG. 21, the device 112 may be positioned along the central axis 124 (shown in FIG. 18), with the slot channel 150 containing the tee-bolt 160 within it, but not preventing movement along the central axis 124.

Looking now at FIG. 22, the device 112 is shown after being fully installed on the accessory mounting track 110. The device 112 has female threads 170, which are threaded onto the stud 164 of the tee-bolt 160.

It should be appreciated that by rotating the device 112, the threads 166 of the stud 164 interact with the female threads 170, which may urge the device 112 towards or away from the head 162 of the tee-bolt 160, depending on the direction of rotation. When appropriately rotated, the device 112 is urged towards the head 162 of the tee-bolt 160 until the mounting surface 113 of the device 112 makes contact with the track upper surface 158 (shown in FIG. 20) of the accessory mounting track 110 and the head upper surface 168 makes contact with the containment ledge 154. When the device is turned further, friction is increased between these surfaces, which effectively locks the device 12 in position. By rotating the device 112 in the opposite direction, the friction is eliminated and the device 112 may once again be positioned along the central axis 124, or removed from the track through the slot opening or by sliding it out of either end of the accessory mounting track 110.

Figure 24:
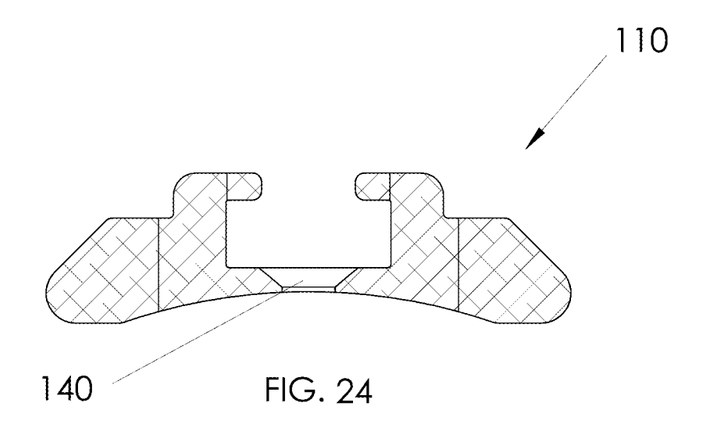
FIG. 24 is a cross-section of the accessory mounting track showing a counter bored attachment hole approximately centered and along the longest axis of the track.

The accessory mounting track 110 may comprise an extruded profile with attachment holes 140. The length of the track 110 may vary as may the number of attachment holes 140. The attachment holes 140 may be disposed linearly near the outer edges of the track 110 or linearly, approximately centered and along the longest axis of the track 110 (see FIG. 24). The attachment holes 140 may be of counter bore or countersink type, or may be simple thru holes. The recess 144 may be concave, angular, or another shape, allowing clearance for attaching to rounded or irregular surfaces and maximizing stability by enabling the supporting environment to make contact with the track 110 along the edges. The region near the outer edges of the underside of the track 110 may be flat and approximately aligned with the rows of attachment holes 140 to maximize lateral stability.

The track 110 composition may be of a lightweight material, such as aluminum or plastic, or a composite comprising two or more such materials. The surface of the track 110 may be treated for harsh environmental exposure, such as UV radiation and saltwater. The upper surface of the track 110 may be textured with any suitable texture to improve the gripping characteristics of that surface, which may increase resistance to accessories mounted to that surface from slipping either by rotation or linearly along the axis of the track 110. This texture may be the result of geometry in the track shape, such as ridges or grooves in the surface. Alternately or in addition to this geometry, the texture may be the result of etching, application of plastic or rubberized coating, or other surface treatments.

Attachment of the track 110 to the support surface may be achieved by putting screws or other suitable fasteners through one or more of the attachment holes 140 and into the surface on which the track 110 is to be mounted. In some configurations, the track 110 may be attached to an adapter bracket, such as a rail clamp, for attachment to the environment, or molded or integrated into the support surface.

The track profile may contain an internal C-shaped slot or other suitable shape to receive a tee-bolt, sliding nut, or other connecting feature internally with which to attach accessory devices.

The tee-bolt 160 may be attached to the device 112 by screwing the threaded stud 164 of the tee-bolt 160 into the device 112, leaving the head 162 of the tee-bolt 160 extended some distance from the device 112.

Attachment of the device 112 to the track 110 may be achieved by inserting the head 162 of the tee-bolt 160 into a slot opening 152. The C-shape of the slot 150 may captivate the head 162 of the tee-bolt 110, allowing movement only along the long axis of the track 110. Once positioned, the device 112 may be immovably tightened to the track 110 by rotating the device 112. The interaction between the threads in the device 112 and those on the stud 164 urges the head 162 of the tee-bolt 160 towards the device 112, thus causing the head 162 of the tee-bolt 160 to make contact with the inside of the slot 150 and causing the device 112 to make contact with the upper surface of the track 110 opposite of the slot 150. Further rotation of the device 112 creates pressure on these areas of contact, the resulting friction of which, with reasonable tightening force, is adequate to inhibit rotation of the device 112 in either the tightening or the loosening direction or from slipping linearly along the track 110. As previously mentioned, texture on the mounting surface of the track 110 may increase this friction.

It should be understood that although a tee-bolt attachment method is depicted in these drawings, other methods of secure and removable attachment of devices to the accessory mounting track 110 may also be used. For example, in an alternate configuration, a slot nut and stud configuration (not shown) may be used instead of a tee-bolt. In this configuration, the slot nut is inserted into the slot 150 instead of the head of the tee-bolt. The slot nut is not permanently attached to the stud as it is in the tee-bolt configuration, but instead has female threads which interact with a stud, resulting in a tightening effect that is to that of the tee-bolt configuration.

In applications in which excessive rotational forces may be applied to the device 112, an external locking mechanism (not shown) may be used to prevent the device 112 from rotating in the loosening direction. Also, mechanical features (e.g. grooves, serration, or teeth) may be incorporated into some surface on or surfaces on the track that cooperate with corresponding features on the device 112, or that encourage increased friction between the track and the device.

On the sides of the track there may be grooves in a dovetail, radial, or other shape (not shown), which may allow attachment of devices by externally clamping the track 112, in cooperation with or independent of the C-shaped slot 150 described above. In this application, the device 112 may have features that cooperate with the grooves so that when it is tightened, the features in the device 112 will mechanically interlock with the grooves.

The ends of the track 110 may be contoured to remove edges that may cause injury or snags or may be angled in such a way that interference of gear, persons or other external items is minimized.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

LIST OF REFERENCE CHARACTERS 10 accessory mounting bracket
12 device
13 mounting surface
14 environmental surface
16 mounting screws
18 washers
20 nuts
22 base structure
24 attachment holes
26 countersink feature
28 auxiliary device attachment holes
29 nut retention pocket
30 track attachment hole
32 device mounting interface
34 open-ended slot
36 slot opening
38 slot termination 40 clearance channel
42 retention pocket
44 left lateral support pad
46 right lateral support pad
48 chamfer
50 tee-bolt
51 upper planar surface
52 head
53 blind hole
54 stud
55 flare
56 threads
57 lower planar surface
58 head upper surface
59 threaded hole
AR arrows
AL arrows
60 female threads
61 male thread
62 end
W1 width of narrow section
W2 width of wide section
70 alternative device
72 accessory mounting track
80 insert
84 interface surface
90 ball
92 base
80 threaded member
D1 distance D1
D2 distance
D3 distance D3
110 accessory mounting track
112 device
114 environmental surface
120 left support flange
122 right support flange
124 central axis
130 proximal end
134 distal end
132 proximal slot entry point
136 distal slot entry point
140 attachment holes
142 countersink feature
144 concave recess
146 left interface flat
148 right interface flat
150 slot channel
152 slot opening
154 containment ledge
160 tee-bolt
162 head
164 stud
166 threads
168 head upper surface
170 female threads
180 providing a rigid head
182 providing a rigid stud
184 threading the stud into the hole
186 flaring an end of the stud
188 inserting a mandrel in the hole
190 applying pressure with the mandrel

What is claimed is:

1. A tee-bolt comprising:
a head comprising upper and lower surfaces and a female threaded hole passing therethrough between the upper and lower surfaces, and
a stud comprising a male thread having an end threaded through the head so that the end is substantially flush with to the lower surface of the head and a portion of the stud extending from the upper surface of the head, the end of the stud being flared outwardly within the threaded hole and substantially flush with at the lower surface of the head by the application of pressure to form a flare that interacts with the head to inhibit separation of the head and the and wherein the stud further comprises a hole in the end thereof, the end being flared outwardly by inserting a mandrel therein and applying pressure with the mandrel stud.

2. The tee-bolt of claim 1, wherein the hole in the end of the stud is centered in the end of the stud and functions as a central point from which the flare is formed.

3. The tee-bolt of claim 2, wherein the hole in the end of the stud is circular or octagonal.

4. The tee-bolt of claim 3, wherein the mandrel is conical.

5. A tee-bolt comprising:
a solid flat metal head comprising a female threaded hole passing therethrough between upper and lower planar surfaces thereof, and
a solid elongated metal stud comprising a male thread extending along the stud in an outer surface thereof, the stud having an end threaded into the threaded hole but not beyond the lower planar surface of the head and a portion that extends from the upper planar surface of the head, the end of the stud being flared outwardly within the threaded hole by the application of pressure to form a flare that interacts with the head to inhibit separation of the head and the wherein the stud further comprises a hole in the end thereof, the end being flared outwardly by insertion of a mandrel into the hole and applying pressure with the mandrel to form the flare stud.

6. The tee-bolt of claim 5, wherein the hole in the end of the stud is centered in the end of the stud and functions as a central point from which the flare is formed.

7. The tee-bolt of claim 6, wherein the hole in the end of the stud is circular or octagonal.

8. The tee-bolt of claim 7, wherein the mandrel is conical.

\* \* \* \* \*